May 10, 1932. J. J. SUNDAY 1,858,028
AUTOMOBILE HEATER
Filed Sept. 30, 1929
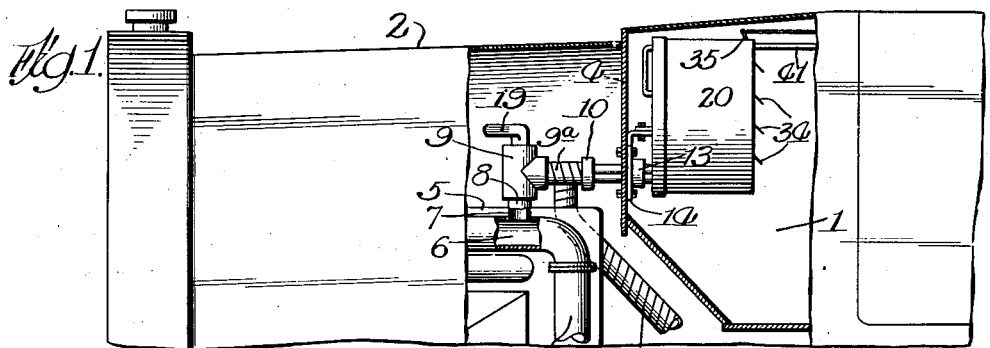
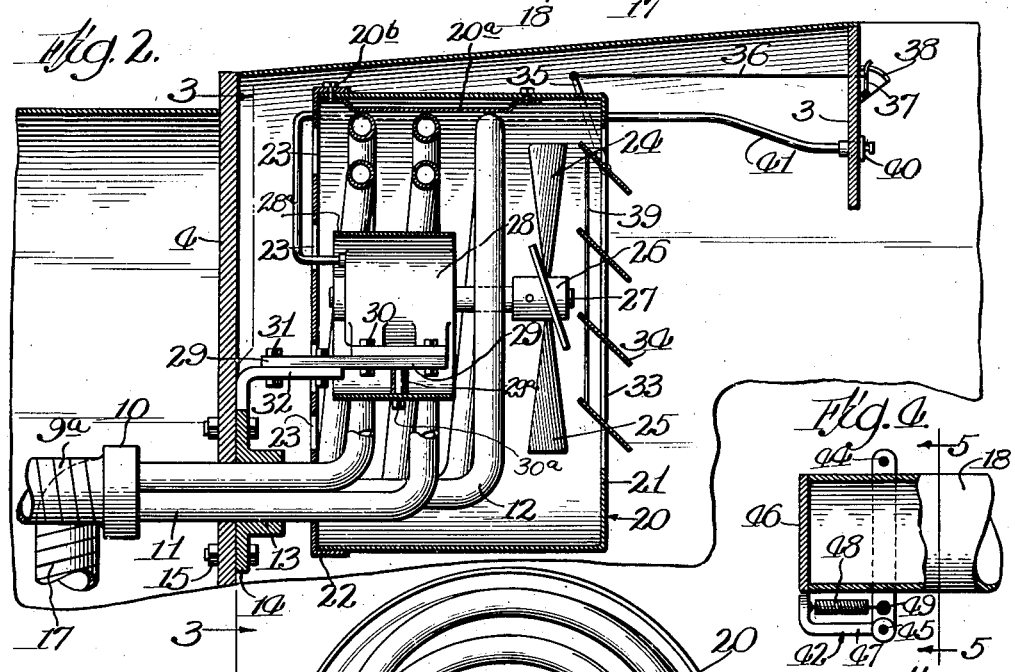
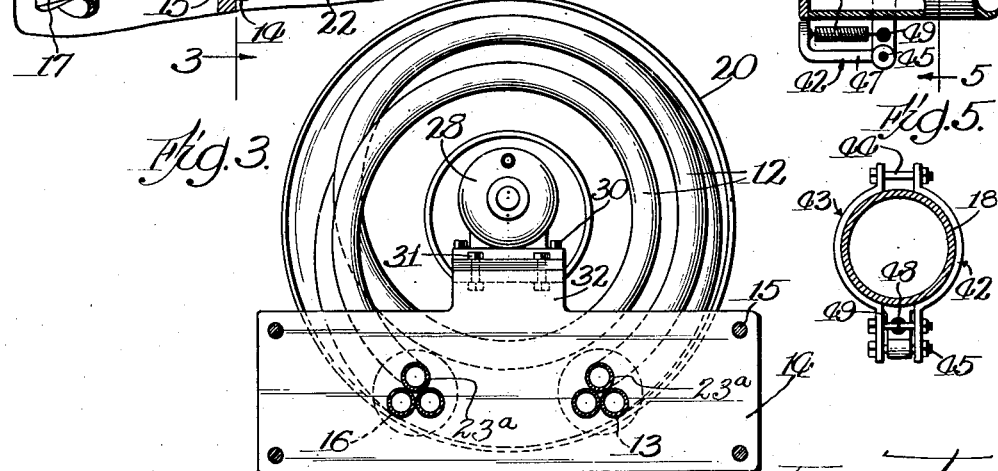
Inventor.
James J. Sunday
By: Wallace R. Lane
Atty Patented May 10, 1932

1,858,028

UNITED STATES PATENT OFFICE

JAMES J. SUNDAY, OF CHICAGO, ILLINOIS, ASSIGNOR, BY MESNE ASSIGNMENTS, TO DELCO PRODUCTS CORPORATION, OF DAYTON, OHIO, A CORPORATION OF DELAWARE

AUTOMOBILE HEATER

Application filed September 30, 1929. Serial No. 396,072.

The present invention relates to heating devices and more in particular to heaters for automotive vehicles or the like.

Among the objects of the invention is to provide a novel heater having a heat medium conveying means for the passage thereto of a heated body, the heat units carried thereby being transferred by radiation, to and absorbed by an air stream which is then directed by suitable means to a point or points within the vehicle.

The invention comprehends the idea of providing an air means, impeller, rotor or the like in association with the heat medium conveying means for effecting a movement and circulation of air about and around the heat medium conveying means which likewise effects a diffusion and dissemination of the heated air stream.

Another feature of the invention is to provide means within easy reach of the operator of the vehicle for controlling the rotation of the air moving means or impeller such as to cause circulation of air about and around the heat medium conveying means.

Still another feature of the invention is to provide a housing or casing for enclosing the impeller or air moving rotor and heat medium conveying means, this housing having an inlet means for the supplying of air to be heated and an adjustable outlet means controlling and regulating the passage of the heated air streams. This adjustable outlet means is of suitable construction for controlling the quantity of heated air passing therethrough as likewise deflecting the same in the direction desired. Suitable control means are provided within easy reach of the operator of the vehicle, as for example on the instrument board thereof, such that the adjustment of the outlet means may be readily effected.

Another object of the invention is to provide a novel heater for an automotive vehicle provided with an exhaust means or manifold, the heat medium conveying means of the heater being in communication with the exhaust means for the circulation and passage therethrough of the heated products of combustion.

The invention further comprehends the idea of providing a novel heater for automotive vehicles, the heat medium conveying means of which is within the body compartment of the vehicle and protrudes or extends through the dash-board for connection to the exhaust means of the motor whereby the obnoxious gases of combustion which might escape through such a connection will not enter the body compartment. Valve means are further provided adjacent the exhaust means to prevent passage of the heated gases of combustion through the heat conveying means during warm weather, or whenever desiderd, and to also control the amount of heat supplied when less than the full amount is desirable.

Other objects, advantages, capabilities and features are comprehended by the invention as will later appear and as are inherently possessed thereby.

My invention further resides in the combination, construction and arrangement of parts illustrated in the accompanying drawings, and while I have shown therein a preferred embodiment, the same is susceptible of modification and change without departing from the spirit of my invention.

Referring to the drawings:

Fig. 1 is a fragmentary view in side elevation of a motor vehicle having an exhaust means, with parts cut away to show the novel heater device as being connected thereto.

Fig. 2 is a fragmentary longitudinal cross sectional view of the front portion of a motor vehicle and disclosing in vertical cross section a heater constructed in accordance with the invention and as extending through the dash-board thereof.

Fig. 3 is a transverse cross sectional view taken on the line 3—3 of Fig. 2 of the drawings with parts cut away to show the formation of the heat conveying means within the housing of the heater.

Figure 4 is a detail sectional view of the end of the exhaust pipe and closure mechanism therefor.

Figure 5 is a transverse sectional view taken on the line 5—5 of Fig. 4.

Referring now more in particular to the drawings, the embodiment selected to illustrate the invention is shown as being within the body compartment 1 of a motor vehicle 2 having an instrument board 3 and dashboard 4 as likewise an internal combustion engine 5 at the forward end thereof, provided with an exhaust pipe 18.

The engine is provided with an exhaust means or manifold 6 having tapped therein a threaded opening 7 to receive a nipple 8 on the other end of which is threaded a right angle valve 9. Brazed or otherwise secured in an opening in the side of this valve is a flexible nipple 9$^a$ having brazed or otherwise secured on its other end a coupling union 10 provided with a trinity of openings for receiving the intake ends 11 of three tubular coils 12 which intake ends are brazed or otherwise secured in said coupling 10.

These tubular coils 12 are convolutional or otherwise passed through the heater housing 20, the ends 11 passing through the dash board 4 and are brazed or otherwise secured in an opening 13 of a flanged plate 14 secured to the dashboard by any suitable means such as bolts 15 or the like, (see Figs. 2 and 3). The other ends of the tubes extend through and are supported in an opening 16 in the flanged plate 14, (see Fig. 3) the ends being brazed or otherwise secured to a union coupling (not shown) similar to the coupling 10, which in turn is secured to a discharge pipe 17, which extends to the rear of the car, or other desired point, and there opens to the atmosphere.

A circulatory system is thus provided from the exhaust manifold 6 through the tubes 12, pipe 17 and thence to the atmosphere for the circulation and passage of the heated products of combustion from the engine 5 when the valve gate of the valve 9 is opened by the lever 19 to permit a portion of the hot exhaust gases to pass from the exhaust manifold into the nipple 8. The back pressure in exhaust pipe 18 due to the exhaust muffler will increase the tendency of the exhaust gases to pass through opening 7 in nipple 8 and thence through the heating coils 12 and out through pipe 17. An ideal condition would be to have the cross-section of the openings leading into and through the heating coils 12 substantially the same as that of the exhaust pipe 18 to permit substantially equal amounts of exhaust gases to pass through each when valve 9 is open, but this proportion can be varied as desired.

Means are provided adjacent the outlet end of pipe 18 so that when the motor of the vehicle is running slow as when the car is stopped or in slow motion, resistance is offered to the flow of the heated products of combustion and a greater volume thereof will pass through the coils 12 and pipe 17. Such means comprises a closure mechanism 42 adapted to be easily attached to the end portion of the exhaust pipe 18. Adjacent the end of the pipe 18 is provided a split collar or ring 43 adapted to be clamped onto the pipe 18 and held in position by means of bolts 44 and 45. A closure plate 46 is further provided and is adapted to abut the end of the exhaust pipe 18, this plate having an arm 47 with an aperture or opening at its end for mounting the closure plate on the bolt 45. A coiled spring 48 is connected to the plate and is secured to a bolt 49 extending through openings in the split collar or ring 43 for holding the plate 46 in contact with or adjacent the end of pipe 18.

The coiled tubes 12 are enclosed within a housing 20, this housing comprising a cylindrical shell 21 adapted to surround these coils over the front end of which is a closure member or flanged cover 22 for frictional engagement with the open end of the shell such that the same may be easily removed. The cover 22 is provided with openings or inlets 23 for entrance of air into the housing and for circulation about the coils 12, and with openings 23$^a$ (see Fig. 3) adapted to fit around the tubes 12 for supporting the housing. A bracket 20$^a$ is brazed or otherwise secured to the coils, this bracket having openings in its ends adapted to register with similar openings in the housing 20 for receiving bolts 20$^b$ or other like connecting means, for further supporting the housing 20 and cover 22 and for holding the coils 12 rigid therewith.

For increasing the quantity of air which may be heated and projected into the body compartment of the motor vehicle, an air moving rotor or fan 24 is provided, this fan having blade elements 25 extending radially from a hub 26 mounted upon a shaft 27 of a motor 28 within the tubular coils 12. This motor is secured to a plate or platform 29 by bolts 30 or the like, this plate or platform in turn being secured by means of bolts 31 to the bracket or arm 32 of the plate 14, this bracket extending through suitable apertures in the cover 22 of the housing. In order that the motor may not become overheated from the heated coils 12, a cylindrical casing 28$^a$ is provided, this casing being connected to and supported by the platform 29 by means of a bolt 30$^a$ passing through a sleeve 29$^a$ interposed between the platform and casing.

The surface of the radially extending blades 25 of the fan 24 are angularly disposed to the plane of rotation such that air is drawn into the housing through the openings 23 and a circulation thereof is effected within the housing and about the coils 12 and then projected toward and through an opening or openings 33 in the housing and into the body compartment 1 of the motor vehicle. Pivotally mounted shutters 34 are provided for completely closing the opening 33 of the housing or for varying the volume of heated air passing through the opening as well as to control the direction of the flow of the air streams into the body compartment. These shutters may be extended in any direction desired to deflect the heated air in any desired path or paths.

The uppermost vane of the shutter mechanism is provided with a projecting shaft or rod to which is connected an arm or lever 35 pivotally connected with a rod 36 projecting through the instrument board 3 and movable by means of a lever 37 pivoted in a control plate 38 adjacent the operator's seat. The vanes of the shutter are connected by a rod 39 for effecting a simultaneous movement thereof when the rod 36 and lever 35 are operated.

The volume of air to be heated by the tubular coils 12 and directed into the body compartment of the vehicle may be varied and controlled by varying the speed of the rotation of the fan 24 and the armature of the motor 28, this variation in speed being effected by way of a rheostat 40 on the control board 3. This rheostat is positioned on the control board adjacent the operator and provides means for varying the flow of electrical energy in wires within the flexible tubing 41 which lead to the armature and stator windings of the motor 28. A constant speed motor may be used if desired.

Either one or both of these control means on the instrument board 3 may be manipulated for properly adjusting the volume and temperature of the heated air which passes through the heater and into the body compartment of the vehicle.

Having thus disclosed the invention, I claim:

1. A heater for a motor vehicle having body and engine compartments separated by a partition, comprising a plurality of jointless heat medium conducting members located in the body compartment and having their ends extending through the partition into the engine compartment, a conduit connecting one end of each of said members with the exhaust pipe of the vehicle engine whereby the exhaust gases will be caused to circulate through said members, and means for causing a circulation of air about said members.

2. A heater for a motor vehicle comprising a heat medium conducting member adapted to receive the exhaust gases of the vehicle engine, a fan adapted to circulate air about said member, an electric motor serving to drive said fan, said heat medium conducting member surrounding said motor, and means located between said member and said motor to prevent said motor from becoming heated by said member.

3. In combination, an internal combustion engine exhaust pipe, an air heating member, a conduit connecting said air heating member with said exhaust pipe whereby a portion of the exhaust gases are caused to circulate through said member, and means associated with said exhaust pipe serving to automatically cause a larger proportion of the exhaust gases to circulate through said member at low engine speeds than at high engine speeds.

4. In combination, an internal combustion engine exhaust pipe, an air heating member connected with said exhaust pipe, a valve associated with said exhaust pipe, and a spring connected to said valve, said spring serving to hold said valve closed at very low engine speeds to cause all of the exhaust gases to flow through said member, said valve being held open by the pressure of the exhaust gases at moderate or high engine speeds in order that only a small proportion of the exhaust gases will be caused to flow through said member.

In witness whereof, I hereunto subscribe my name to this specification.

JAMES J. SUNDAY.